March 19, 1946. J. S. McLEAN 2,396,870
HAND ELECTRIC WELDING TONGS
Filed Nov. 6, 1944 2 Sheets-Sheet 1

INVENTOR.
JAMES S. McLEAN
BY *Victor J. Evans & Co.*
ATTORNEYS

March 19, 1946.  J. S. McLEAN  2,396,870
HAND ELECTRIC WELDING TONGS
Filed Nov. 6, 1944  2 Sheets-Sheet 2
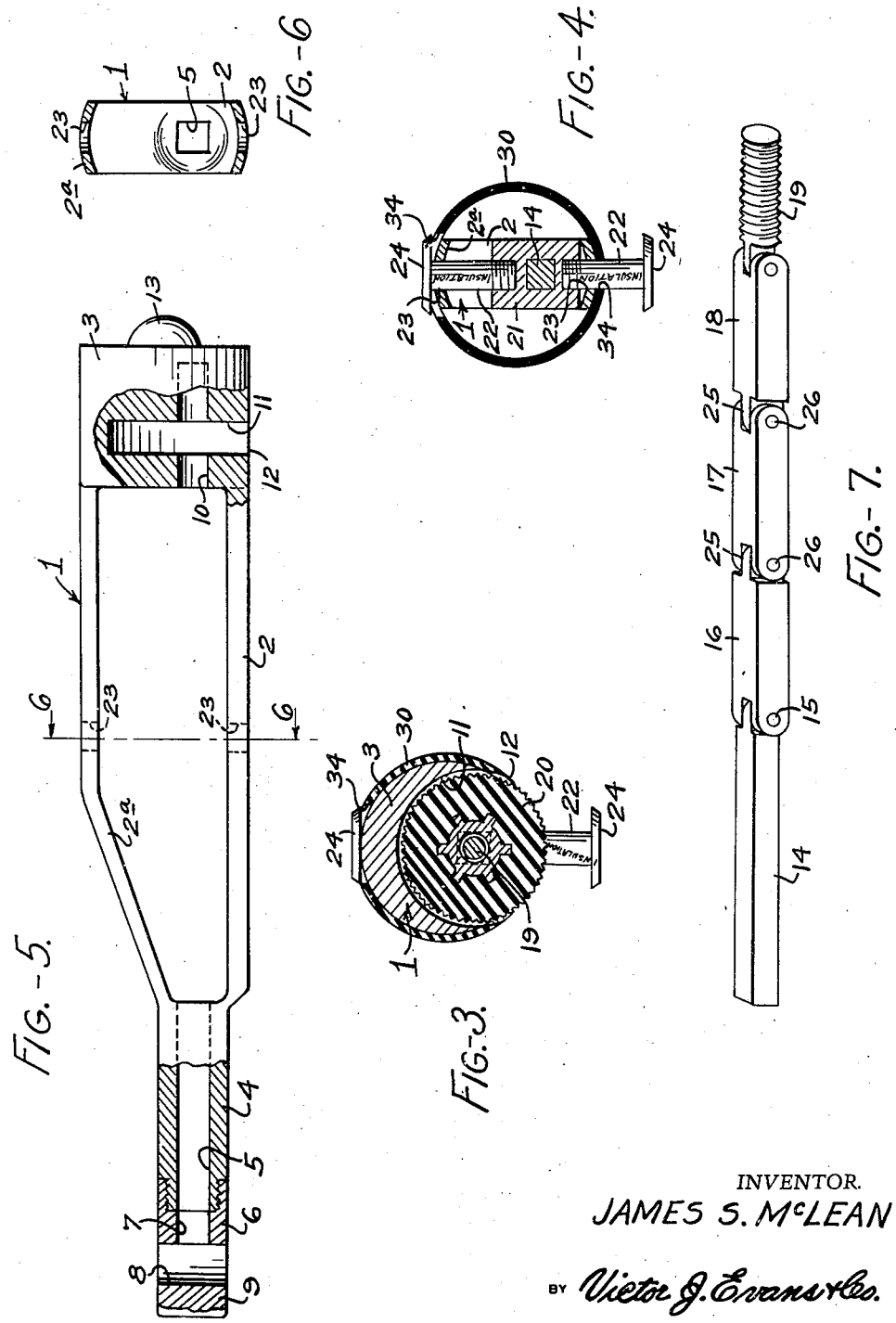
INVENTOR.
JAMES S. McLEAN
BY *Victor J. Evans & Co.*
ATTORNEYS Patented Mar. 19, 1946

2,396,870

UNITED STATES PATENT OFFICE 2,396,870

HAND ELECTRIC WELDING TONGS

James Saul McLean, Oakland, Calif.

Application November 6, 1944, Serial No. 562,117

6 Claims. (Cl. 219—8)

My present invention, in its broad aspect, has to do with improvements in tongs or implements for holding welding rods, and more particularly, it is my purpose to provide a device which is fully adjustable to different sizes of welding rods and to insure the most effective clamping action on a welding rod, which is quickly operable to both engage or disengage a welding rod therefrom, and which will promptly release and discharge stubs or butts of welding rods without sticking and clogging, and which will not heat up or become inapt or impractical in use. Furthermore, my invention is simple, sturdy and efficient in construction, has improved means for clamping or attaching the cable and has no inaccessible or intricate parts.

In producing the above advantages and objects, I employ a one-piece frame, and an insulating ventilated cover; within the frame is a pivoted link device which operates the welding rod movable clamping jaw and which is fully adjustable and is designed for quick and positive clamping and releasing action. My device can be manufactured largely of plastics and may be sold at a relatively small price and has no parts likely to become worn, inoperative or broken.

Other and equally important objects and advantages will be apparent from the detailed description and drawings, but it is to be understood that changes in form, size, shape, materials, construction and arrangement of parts may be made without departing from my broad inventive concept, or the scope of the appended claims.

In the drawings wherein I have illustrated a preferred form of my invention—

Figure 3 is a transverse section on the line 3—3 of Figure 2;

Figure 4 is a transverse section on the line 4—4 of Figure 2;

Figure 5 is a detail of the frame partly broken away;

Figure 6 is a detail of the frame taken on the line 6—6 of Figure 5, and

Figure 7 is a perspective view of the operating links, movable jaw and adjusting screw.

In the drawings wherein like characters of reference are used to designate like or similar parts—

Figure 1:
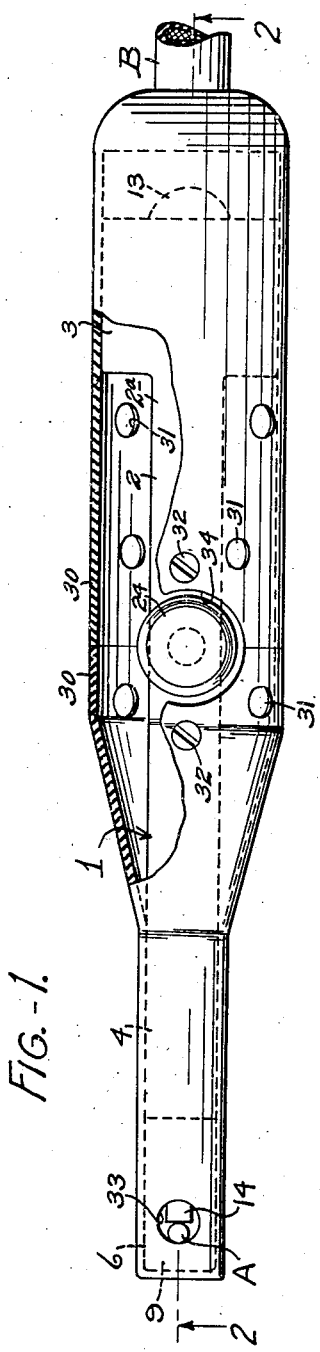
Figure 1 is a side view partly broken away to show the frame.

The numeral 1 designates a one-piece frame having a body 2, and a web 2a, a head 3, and a shank 4 having a rectangular channel 5 and a threded reduced end on which is removably received the extension 6 which has a rectangular channel 7 communicating with channel 5 and a transverse opening 8 across the channel 7. The extension is of the same diameter as the shank, and the part 9 constitutes the fixed jaw, the welding rod A being received through the transverse opening 8. Manifestly, if the extension becomes worn or burned or the like, it may be easily and cheaply replaced. Furthermore, the opening 8 may be at an angle to hold welding rods at an angle as shown in dotted lines in Figure 2. The head portion of the frame is formed with a longitudinal bore 10 to one side of the axis of the frame, communicating intermediate its ends with a semi-circular cavity 11 opening through the side as at 12. The end of the head has a semi-cylindrical crown 13.

Slidably mounted in the channels 5 and 7 is a jaw 14 for cooperation with the fixed part 9 to engage and clamp the welding rod A in position. The sliding jaw 14 is pivotally connected as at 15 to the end link 16 of three links, the other two of which are designated by 17 and 18 respectively; 17 being the middle link, and 18 the link at the opposite end which has a threaded pivoted extension 19 which extends into the bore 10 of the head 3 and into threaded engagement with the knurled adjusting disc or wheel 20 which is mounted in the circular cavity 11 and extends out the open side 12 to be engaged by the finger or the like—see Figure 3. The middle link 17 slidably carries a block 21 which carries on opposite sides the opposed operating pins 22 extending through openings 23 in the frame and having heads 24. Thus, by moving the middle link by means of pressure on the pins 22 from the full line to the dotted line position of Figure 2, the sliding jaw is respectively moved into or out of engagement with the welding rod, and the stroke or extent of movement is adjustable by turning the disc or wheel 20 to take up or let out the extension 19. Attention is called to the positiveness of the clamping action due to the axial alignment of the links in clamping position, and the speed of release by simply moving the links. The connection between the links is strong and simple, each link having a bifurcation at one end and a tongue at the other interfitting as at 25 and pivotally connected as at 26. Furthermore, adjustment is equalized by the slidable arrangement of the middle link in the block.

Figure 2:
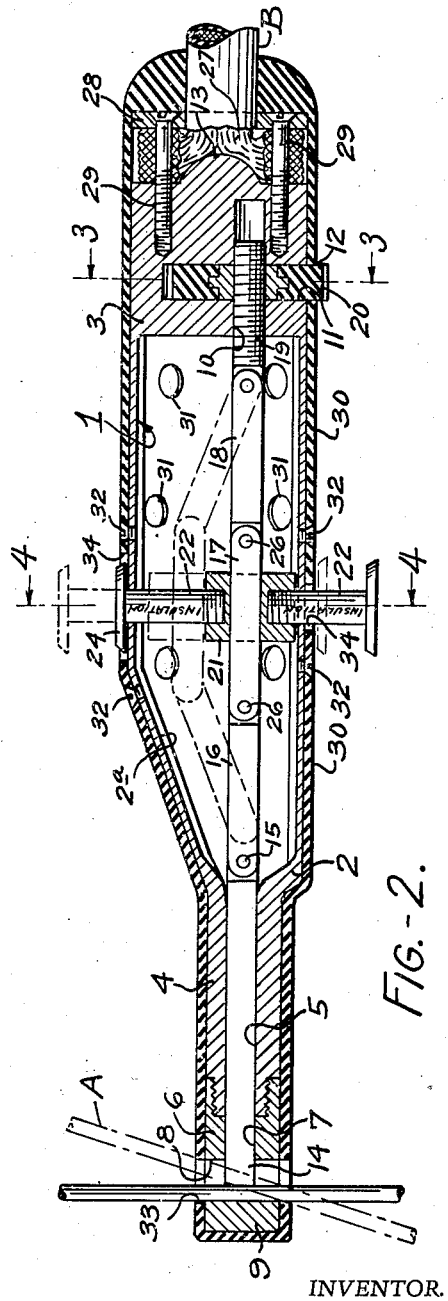
Figure 2 is a longitudinal section on the line 2—2 of Figure 1.

The cable B is attached to my device by spreading the end as at 27 over the semi-cylindrical part 13 as shown in Figure 2 and clamping the same down with a washer 28 adjustably held in place by screws 29. An insulating two part cover 30 provided with plural openings 31 to prevent heating and to provide ventilation is attached to the frame by screws 32, and extends completely about the frame, having openings 33 for the welding rod A and openings 34 for the pins 22. Particular attention is called to the simplicity of my device, and the ease and effectiveness of its operation.

It is believed that the operation and advantages of my invention will be apparent from the foregoing, but it is again emphasized that interpretation of its scope should only be conclusive when made in the light of the subjoined claims.

I claim:

1. A device for holding welding rods, comprising a frame, a fixed jaw formed on the frame, a channel in the frame, a sliding jaw, mounted in the channel in the frame, a link operating member pivoted to the sliding jaw, an adjusting member attached to the link operating member, and means for moving the links to slide the sliding jaw toward or away from the fixed jaw to clamp a welding rod between said jaws or release said rod.

2. A device for holding welding rods, comprising a frame, a channel in the frame, a sliding jaw in the channel, a fixed jaw opposing the sliding jaw and formed on the frame, a toggle link operating member pivoted to the sliding jaw, an adjusting member attached to the link operating member, a block slidable on one of the links, pins for laterally moving the block to displace the links to move the sliding jaw toward and away from the fixed jaw, a casing about the frame, and a cable clamped to the frame.

3. The invention as defined in claim 2 wherein the adjusting means include a screw pivotally attached to one of the links and movable in a bore in the frame, and an adjusting wheel on the screw and seated in a cavity in the frame.

4. The invention as defined in claim 2 wherein the toggle links are three in number and pivotally connected together and the respective end links pivotally attached to the sliding jaw and adjusting member respectively.

5. The invention as defined in claim 2 wherein the casing is sectional, and has ventilating openings and openings for the welding rod and the operating pins for the toggle links.

6. The invention as defined in claim 1 wherein the fixed jaw is formed at the end of the frame and is adjacent a welding rod receiving opening, and the sliding jaw is rectangular in cross section and is movable into said opening to clamp the welding rod between said jaws in said opening.

JAMES SAUL McLEAN.